US011047239B2

(12) United States Patent
James et al.

(10) Patent No.: US 11,047,239 B2
(45) Date of Patent: Jun. 29, 2021

(54) METHOD OF FORMING A CURE TOOL AND METHOD OF FORMING A TEXTURED SURFACE USING A CURE TOOL

(71) Applicant: General Electric Company, Schenectady, NY (US)

(72) Inventors: Hannah Rice James, Woodway, TX (US); Kenneth Paul Zarnoch, Simsponville, SC (US); Wendy Wenling Lin, Montgomery, OH (US); Scott Michael Miller, Clifton Park, NY (US); Laura Liou, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 149 days.

(21) Appl. No.: 16/208,033

(22) Filed: Dec. 3, 2018

(65) Prior Publication Data

US 2020/0173285 A1 Jun. 4, 2020

(51) Int. Cl.
*F01D 5/14* (2006.01)
*F15D 1/00* (2006.01)

(52) U.S. Cl.
CPC .............. *F01D 5/145* (2013.01); *F15D 1/004* (2013.01); *F05D 2230/31* (2013.01); *F05D 2230/41* (2013.01); *F05D 2230/90* (2013.01); *F05D 2250/181* (2013.01); *F05D 2250/183* (2013.01); *F05D 2250/61* (2013.01)

(58) Field of Classification Search
CPC .......... F01D 5/145; F01D 5/141; F15D 1/004; F05D 2250/183; F05D 2230/41; F05D 2230/31; F05D 2230/90; F05D 2250/181; B29C 33/3842; B29C 33/42; B29L 2031/749
See application file for complete search history.

(56) References Cited

U.S. PATENT DOCUMENTS

| | | | |
|---|---|---|---|
| 8,220,754 B2 | 7/2012 | McClure et al. | |
| 8,678,316 B2 | 3/2014 | Rawlings et al. | |
| 8,684,310 B2 | 4/2014 | Rawlings et al. | |
| 9,243,502 B2 | 1/2016 | Xu | |
| 9,297,394 B2 | 3/2016 | Li et al. | |
| 10,107,302 B2 | 10/2018 | Berschback et al. | |
| 10,612,514 B2 * | 4/2020 | Pricone | F03D 1/0641 |
| 2013/0062004 A1 * | 3/2013 | Amirehteshami | B29C 70/78 156/245 |
| 2013/0134292 A1 | 5/2013 | Kray et al. | |
| 2014/0130318 A1 | 5/2014 | Rohr et al. | |
| 2017/0234134 A1 | 8/2017 | Bunker | |
| 2017/0266691 A1 | 9/2017 | Travis | |

FOREIGN PATENT DOCUMENTS

| | | |
|---|---|---|
| WO | 2013005113 | 1/2013 |
| WO | 2013037719 | 3/2013 |
| WO | 2013050018 | 4/2013 |

* cited by examiner

*Primary Examiner* — Richard A Edgar
(74) *Attorney, Agent, or Firm* — Dority & Manning, P.A.

(57) ABSTRACT

A method of making a master cure tool for applying a texture to an aerodynamic surface includes the steps of: providing a foil which is metallic and has a textured surface; applying the foil to a forming surface of a rigid forming tool which is compound curved, and plastically deforming the foil to conform to the forming surface, so as to define a foil layer; annealing the foil layer using heat or a combination of heat and pressure; and bonding the foil layer to a support body, thereby defining the master cure tool.

16 Claims, 11 Drawing Sheets

METHOD OF FORMING A CURE TOOL AND METHOD OF FORMING A TEXTURED SURFACE USING A CURE TOOL

BACKGROUND OF THE INVENTION

This invention relates generally to gas turbine engines, and particularly to a method of applying surface textures to aerodynamic surfaces of gas turbine engine components.

It is known in the prior art to apply a small-scale surface texture to an airfoil such as a fan blade. For example, a protective layer referred to as an "erosion coat" or "erosion film" may incorporate a series of parallel sawtooth-shaped grooves which are referred to as "riblets". These can be effective in reducing aerodynamic drag when they are disposed on an aerodynamic surface in a proper orientation.

Prior art processes for applying riblets or similar surface textures include using a turning process to machine grooves in a master, which is then electroformed with nickel. The nickel layer is removed and forms a foil. The foil is applied to a flat plate which can be used as a master tool. This master tool can be used to impress surface texture directly into a polymeric material such as an erosion coat described above, or may be used to create a caul which may then be used to impress surface texture in polymeric materials.

Many airfoils include complex 3D-aero geometry with compound curvature and it is desirable to apply riblets conforming to the surface in a precise orientation. One problem with the prior art processes described above is that they are only suitable for flat surfaces or simple-curved surfaces. They are not suitable for compound-curved surfaces.

BRIEF DESCRIPTION OF THE INVENTION

This problem is addressed by a process in which a surface-textured foil is formed to a compound-curved surface of a forming tool.

According to one aspect of the technology described herein, a method of making a master cure tool for applying a texture to an aerodynamic surface includes the steps of: Providing a foil which is metallic and has a textured surface; applying the foil to a forming surface of a rigid forming tool which is compound curved, and plastically deforming the foil to conform to the forming surface, so as to define a foil layer; annealing the foil layer using heat or a combination of heat and pressure; and bonding the foil layer to a support body, thereby defining the master cure tool.

According to another aspect of the technology described herein, a method for applying texture to an aerodynamic surface that has compound curvature includes the steps of: providing a master cure tool including a foil layer having a textured surface bonded to a support body, wherein the foil layer has compound curvature; transferring an impression of the textured surface to a curable film material so as to form a textured film; and bonding the textured film to a compound-curved aerodynamic surface.

According to another aspect of the technology described herein, a gas turbine engine component has an aerodynamic surface that has compound curvature incorporating a surface texture, wherein the surface texture is applied by a method of including the steps of: providing a master cure tool including a foil layer having a textured surface bonded to a support body, wherein the foil layer has compound curvature; and transferring an impression of the textured surface to a curable film material so as to form a textured film and bonding the textured film to the compound-curved aerodynamic surface.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
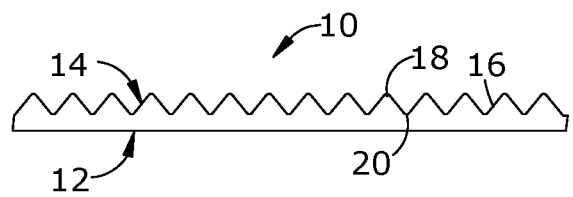
FIG. 1 is a schematic side elevation view of an exemplary foil with a textured surface.

Described herein is a method for producing a "master" cure tool having a textured surface, as well as methods for using the master cure tool to produce components having textured surfaces. Referring to the drawings wherein identical reference numerals denote the same elements throughout the various views, FIG. 1 is a side elevation view of an exemplary metallic foil 10 having opposed first and second faces 12, 14. The second face 14 incorporates a surface texture. In the illustrated example, the surface texture comprises a "sawtooth" profile having side-by-side grooves 16 defining a pattern of alternating peaks 18 and valleys 20. The individual grooves 16 of the sawtooth profile essentially are the negative of a shape (referred to as "riblets") to be formed in a component surface. This is generally a small-scale texture commensurate with the size of a boundary layer passing over and airfoil in operation.

Figure 2:
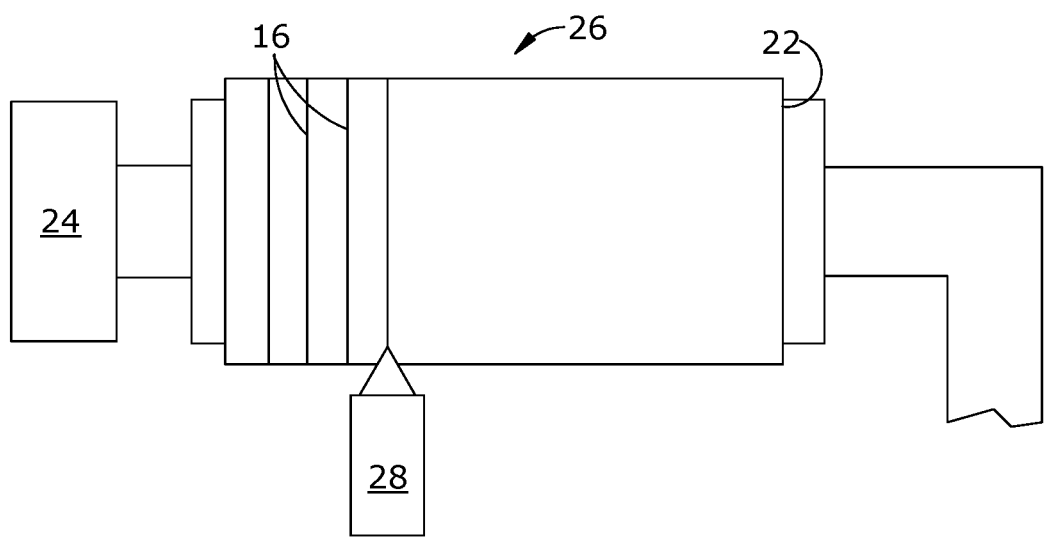
FIG. 2 is a schematic diagram of an exemplary foil turning process.

FIG. 2 shows an initial step in the production of the foil 10. A flexible substrate 22 such as a sheet of metal is mounted in a lathe 24, defining a cylinder 26. One example of a suitable metal is copper or copper alloy. The grooves 16 may be formed in the cylinder 26 using a turning process. In the example shown in FIG. 2, a diamond-tipped single-point turning tool 28 is used to engage the rotating cylinder 26 and thereby cut the grooves 16. While turning is described as an example, the flexible substrate 22 may be formed using any known techniques, including, but not limited to, physical machining, chemical etching, electric discharge machining, or any combination thereof.

A desired riblet pattern on an airfoil varies greatly about the airfoil surface. It may vary in density from one part of the surface to another; the riblets may have a variation in height over the airfoil surface; and the riblets may change in orientation in order to be aligned with local airflow. Accordingly, the grooves 16 may also vary in density, height, and orientation. An optimal riblet pattern may be determined by computational and experimental analysis for a given aerodynamic surface geometry and the operating conditions in which it is to be employed.

After the machine process, the flexible substrate 22 may be coated with an alloy such as nickel, using a conventional electro deposition or electroforming process. As one example, the deposited layer may have a thickness of approximately 0.013 mm (0.5 mils) to 0.018 mm (0.7 mils).

Figure 3:
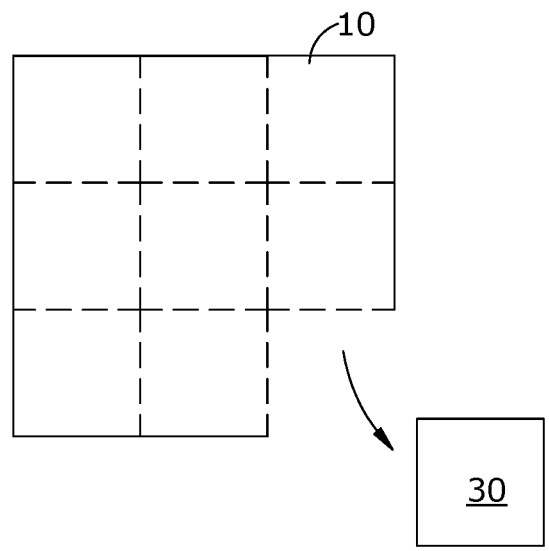
FIG. 3 is a schematic top plan view of a foil, showing a section being cut therefrom.

The deposited layer is then removed from the flexible substrate 22, defining the foil 10 (seen in plan view in FIG. 3). Optionally, the foil 10 may be cut into smaller foil pieces 30. Optionally, more than one foil 10 may be produced. The multiple foils 10 may have different orientations of surface texture. These may be cut into smaller pieces 30 having different orientations of surface texture.

Figure 4:
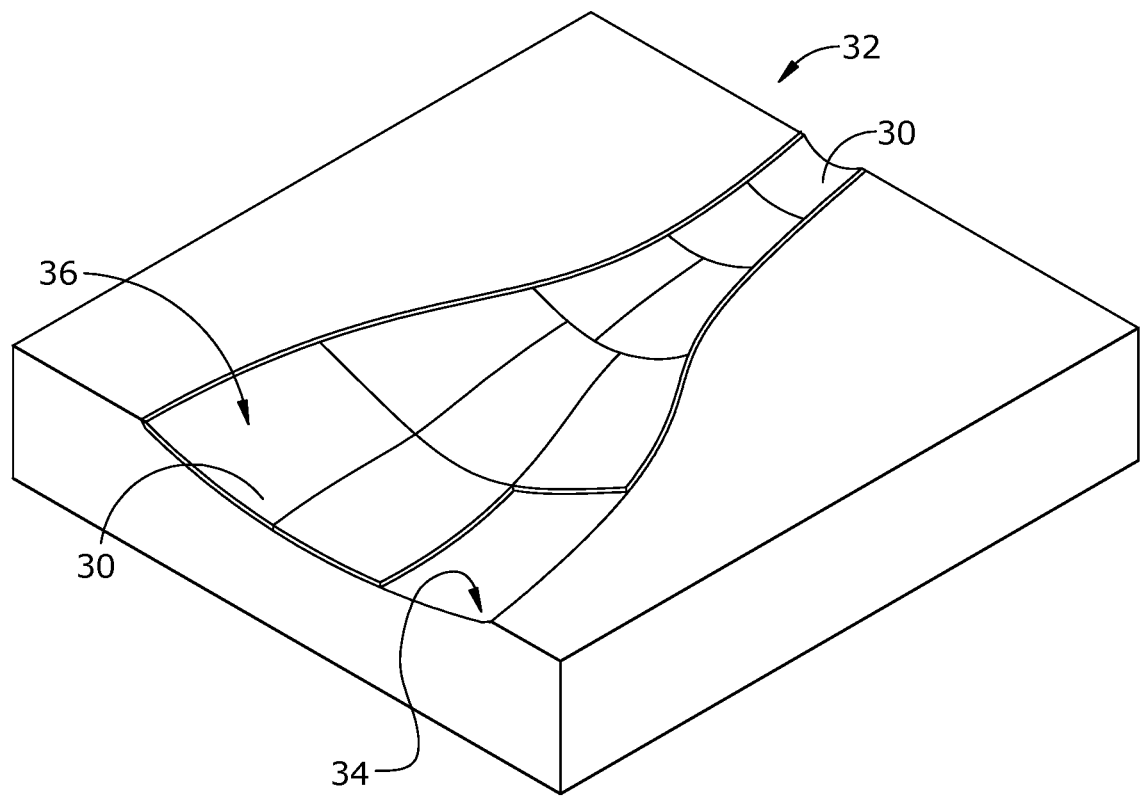
FIG. 4 is a schematic perspective view of a forming tool, showing foil pieces being applied thereto.

Next, the foil 10 (or foil pieces 30) are applied to a forming tool. FIG. 4 shows an exemplary forming tool 32 which is generally a block of material having a forming surface 34 formed therein defining the shape to which the foil pieces 30 are to be formed. Significantly, the forming surface 34 may include nonzero curvature in two or more mutually perpendicular planes. Stated another way, the forming surface 34 may include its compound curvature. In the illustrated example the forming surface 34 is defined by a generally concave recess formed in the forming tool 32. The forming tool 32 is made from a material with sufficient strength and other material properties to endure an annealing process. Nonlimiting examples of suitable materials include metal alloys and polymers. As one example, the forming tool 32 may be machined from a block of steel alloy.

The foil 10 or foil pieces 30 are formed to the shape of the forming surface 34, defining a foil layer 36. If foil pieces 30 are used, each foil piece 30 would be smaller than a total surface area of the forming surface 34, thus making them more readily conformable to the forming surface 34. This process may be done by hand or using a tool (not shown). The forming will involve plastic deformation (e.g., bending) of the foil 10 or foil pieces 30. Heat and/or pressure may be used to facilitate forming. The foil 10 or foil pieces 30 may be bonded to the forming surface 34 to hold them in place temporarily, for example using adhesives or adhesive tape.

Figure 5:
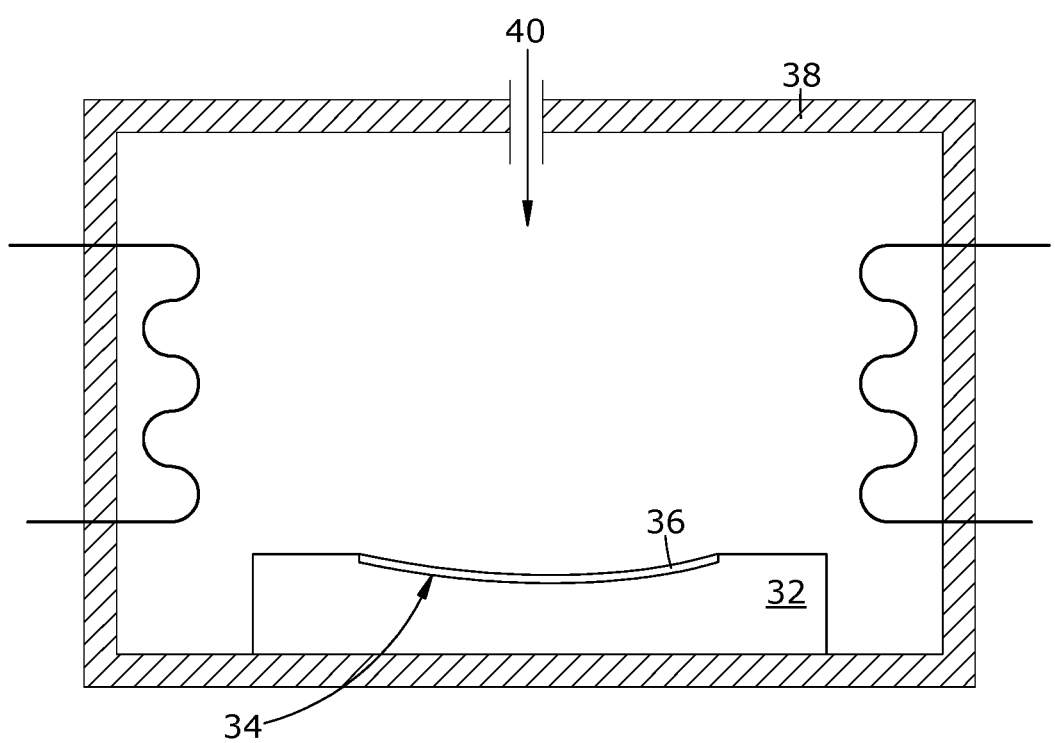
FIG. 5 is a schematic cross-sectional view of a foil in a heating chamber undergoing an annealing process.
Figure 6:
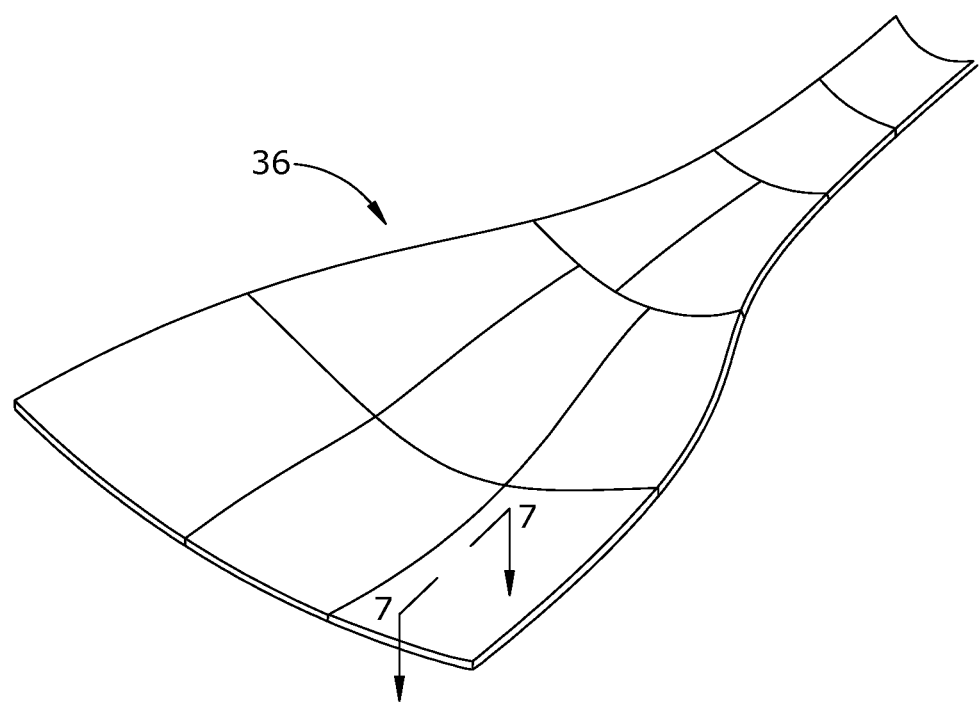
FIG. 6 is a schematic perspective view of a foil removed from the forming tool after the annealing process.
Figure 7:
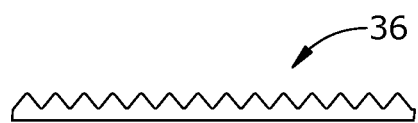
FIG. 7 is a schematic cross-sectional view of a portion of the foil of FIG. 6.

The foil layer 36 and the forming tool 32 are subjected to an annealing process to relieve stresses and cause the foil layer 36 to take a permanent shape. This may be done by placing them in a heating chamber 38 (FIG. 5). Positive pressure 40 (e.g. using inert gas) or vacuum pressure (using a vacuum bag, not shown) may be applied to force the foil layer 36 to conform to the forming surface 34. The annealing time and temperature will depend on the specific alloy. In one example where the foil layer 36 comprises a nickel alloy, the annealing temperature may be on the order of 280° C. (530° F.). FIGS. 6 and 7 show the foil layer 36 after the annealing process. The foil layer 36 retains the compound curvature of the cure tool 32, with the surface grooves in a predetermined orientation. Optionally, the plastic deformation step and the annealing step may be combined in a single process in which heat and pressure are applied to the foil layer 36.

Figure 8:
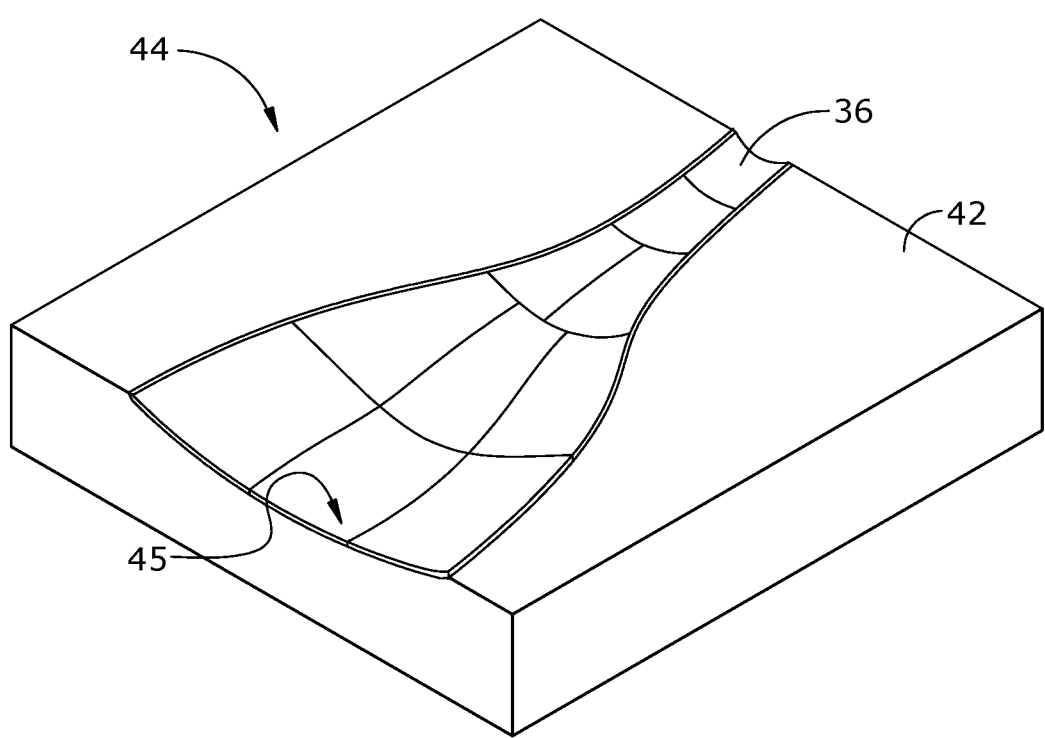
FIG. 8 is a schematic perspective view of a master curing tool comprising a foil bonded to a body.

Once the annealing process is complete, the foil layer 36 is bonded to a support body 42, seen in FIG. 8, using an adhesive, to define a "cure tool" 44 with a textured surface 45. The support body of the cure tool 44 could be the same as the forming tool 32 or a different structure. Generally, the forming tool 32 might be relatively expensive to produce, so the cure tool 44 could utilize a less expensive material such as a polymer. The cure tool 44 may also be referred to as a "master cure tool".

Figure 9:
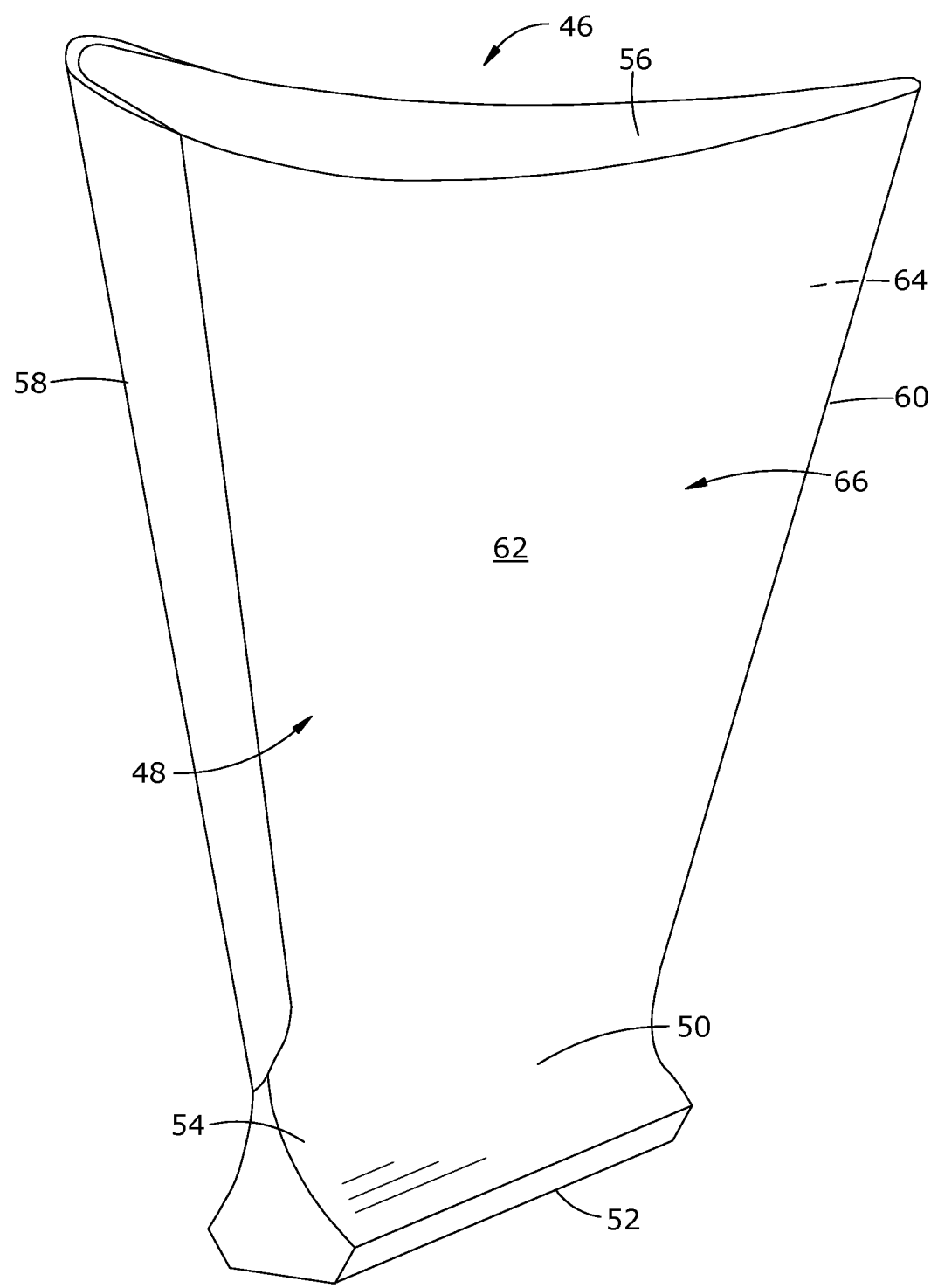
FIG. 9 is a schematic perspective view of an exemplary gas turbine engine fan blade.

The cure tool 44 with the bonded foil layer 36 can be used in multiple ways to produce a textured surface on a component. It is particularly useful for applying a texture (e.g. riblets) to an aerodynamic surface. An aerodynamic surface may include any surface exposed in operation to a fluid flow, including, for example, an airfoil or vane surface, or a platform of a turbomachinery blade. For simplicity, the method described herein is directed to the application of riblets on an airfoil surface. FIG. 9 depicts an exemplary gas turbine engine fan blade 46. The fan blade 46 includes an airfoil 48, shank 50, and dovetail 52. The airfoil 48 extends in chord between a root 54 and a tip 56, and has a leading edge 58 and a trailing edge 60. Opposed convex and concave sides 62 and 64, respectively, extend in chord between the leading edge 58 and the trailing edge 60. The fan blade 46 may be made from one or more metal alloys, or from a nonmetallic material, such as a composite system with an epoxy matrix and carbon fiber reinforcement. The convex and concave sides 62 and 64 individually and collectively define an aerodynamic surface 66.

The cure tool 44 with the bonded foil layer 36 can be used in multiple ways to produce a textured surface on a component. Some examples are described below.

Figure 10:
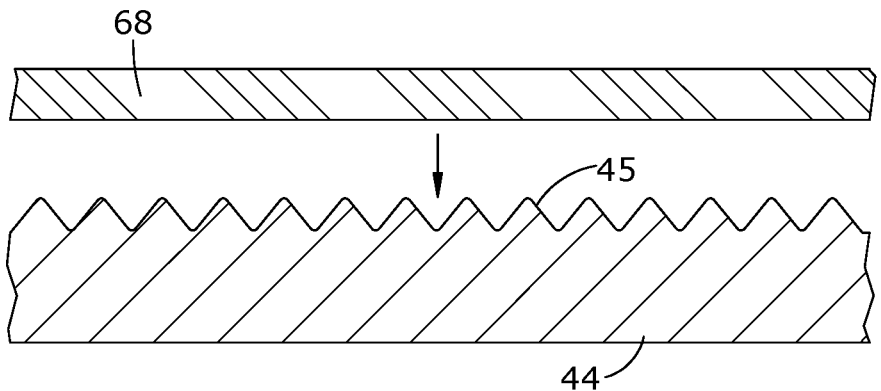
FIG. 10 is a schematic sectional view showing a process of forming a textured film using a master curing tool.
Figure 11:
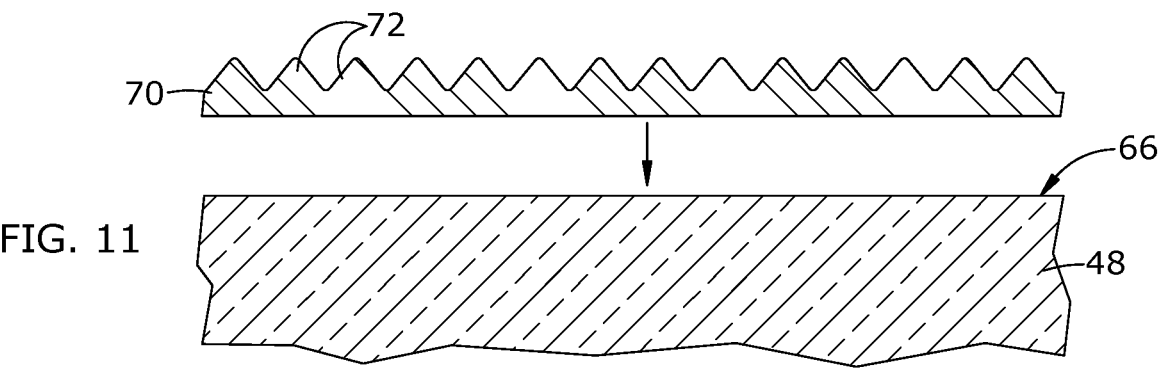
FIG. 11 is a schematic sectional view showing a process of bonding the textured film of FIG. 10 to an aerodynamic surface.
Figure 12:
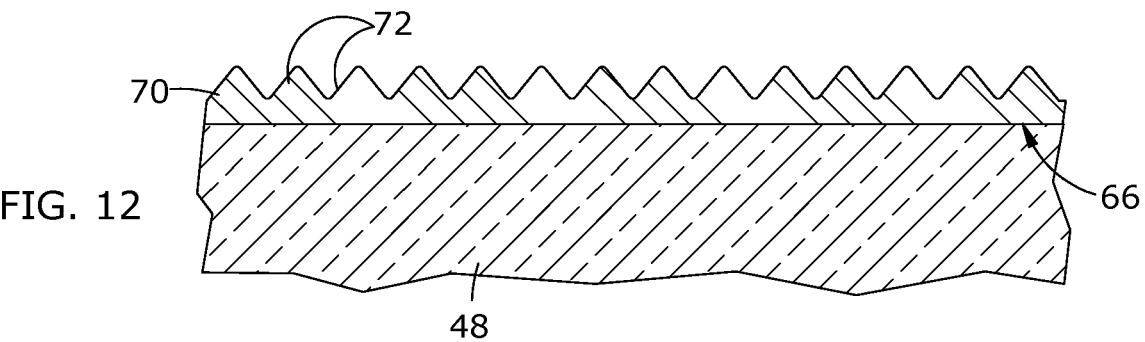
FIG. 12 is a schematic sectional view showing an aerodynamic surface with the textured film bonded thereto.

Referring to FIG. 10, master cure tool 44 can be used to manufacture a textured film which may be applied to an aerodynamic surface. The textured film is formed by first applying a curable and flowable material onto the master cure tool textured surface 45. The film material 68 should flow about the textured surface 45 and completely fill any gaps between ridges. Preferably, the film material 68 will completely encapsulate all surface features of the textured surface (riblets, gaps therebetween, and any contour) free of any air pockets or voids. The film material 68 may be any suitable curable material, which may be, for example, a polymeric material, such as a curable liquid polymer or thermoplastic sheet. The film material 68 may be the same or similar to that which is used in the application of erosion coats on composite airfoils. This material 68 may be, for example, polyurethane. Though not shown, the master cure tool 44 may have walls about its perimeter and/or a backing plate. This may be done in order to keep the film material 68 in place and maintain a uniform thickness while it is being cured. Curing the film material 68 is the next step. The curing process is dependent upon the choice of film material. This curing process may include, but is not limited to, an application of heat and pressure, or a combination thereof. As seen in FIG. 11, once cured, the film material 68 may simply be referred to as a textured film 70 which includes riblets 72 and which matches the compound curvature of the master cure tool 44. This textured film 70 can then be removed and secured to an aerodynamic surface 66 of an airfoil 48 using adhesive. FIG. 12 depicts the textured film 70 bonded to the aerodynamic surface.

Significantly, the textured film 70 conforms to any curvature of the aerodynamic surface 66, including compound curvature, while maintaining the riblets 72 in a desired orientation relative to an anticipated direction of air flow over the aerodynamic surface 66.

Figure 13:
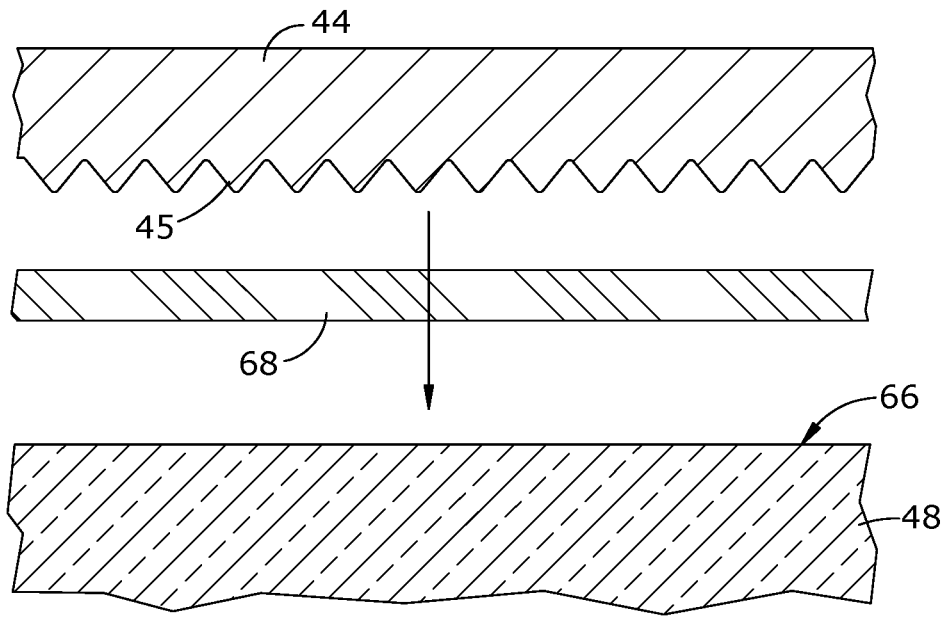
FIG. 13 is a schematic sectional view showing a process of bonding a film to an aerodynamic surface and impressing a texture therein, using a master curing tool.
Figure 14:
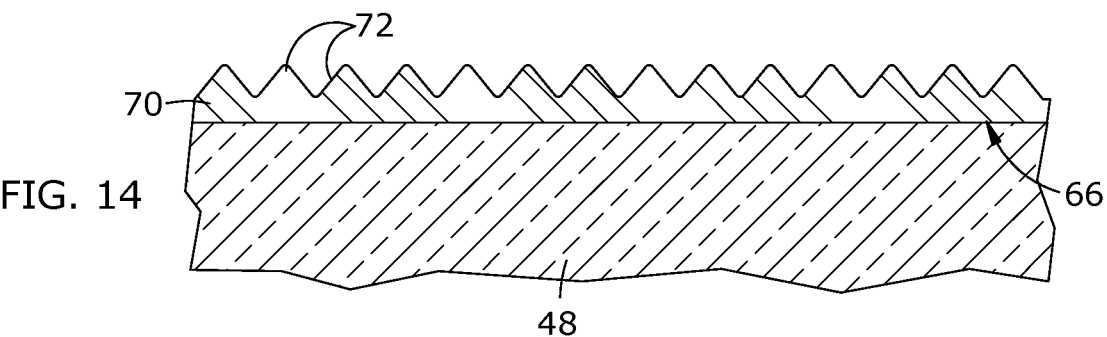
FIG. 14 is a schematic sectional view showing an aerodynamic surface with the textured film of FIG. 13 bonded thereto.

FIGS. 13 and 14 illustrate an exemplary process in which the master cure tool 44 is used to fabricate a textured film 70 in-situ as part of the application of the film to an aerodynamic surface 66. The textured film 70 is formed by first applying a film material 68 substantially as described above onto the aerodynamic surface 66. Curing the film material 68 is the next step. The curing process is dependent upon the choice of film material 68. This curing process may include, but is not limited to, an application of heat and pressure, or a combination thereof. During the curing process, the master cure tool 44 is pressed into the film material 68, thus transferring the texture to the exposed surface of the film material 68. FIG. 14 shows a completed airfoil surface 48 with a cured textured film 70 bonded thereto. The textured film 70 includes a feature such as riblets 72.

The master cure tool 44 described above may alternatively be used to produce a caul sheet which may then be used to produce surface textures on components.

Figure 15:
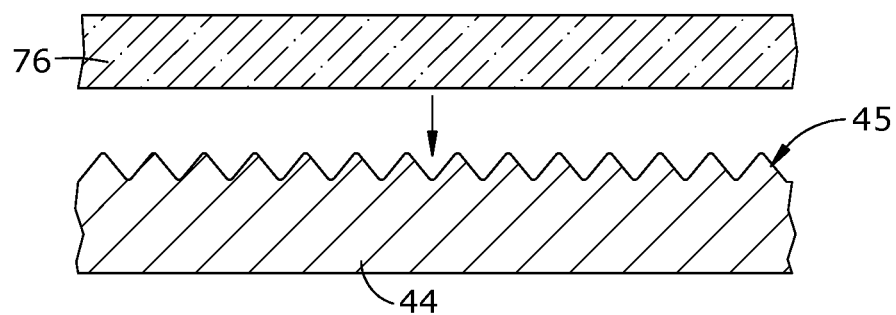
FIG. 15 is a schematic sectional view showing a process of forming a caul sheet using a master curing tool.

The caul sheet 74 is formed by first applying a curable and flowable material onto the master cure tool textured surface 45 (see FIG. 15). The caul sheet material 76 should flow about the textured surface 45 and completely fill any gaps between ridges. Preferably, the caul sheet material 76 will completely encapsulate all surface features of the textured surface 45 (riblets, gaps therebetween, and any contour) free of any air pockets or voids. The caul sheet material 76 may be any suitable material, which may be, for example, a rubber material. Though not shown, the master cure tool 44 may have walls about its perimeter and/or a backing plate. This may be done in order to keep the caul sheet material 76 in place and maintain a uniform thickness while it is being cured. Curing the caul sheet material 76 is the next step in forming the caul sheet 74. The curing process is dependent upon the choice of caul sheet material 76. This curing process may include, but is not limited to, an application of heat and pressure, or a combination thereof. Once cured, the caul sheet material 76 may simply be referred to as a caul sheet 74 and may be removed from the master cure tool 44.

Figure 16:
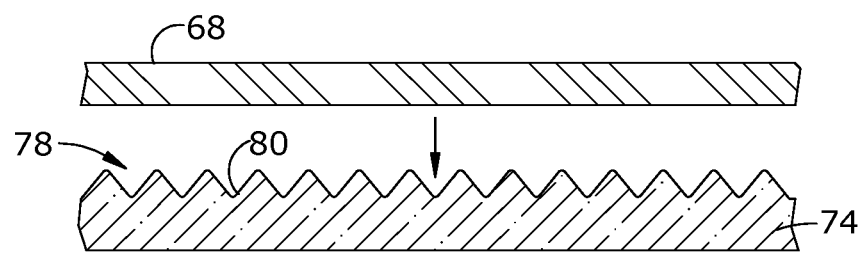
FIG. 16 is a schematic sectional view showing a process of forming a textured film using the caul sheet of FIG. 15.

As seen in FIG. 16, the caul sheet 74 will have a textured surface 78 with a plurality of grooves 80. The textured surface 78 will substantially be a negative impression of the master cure tool textured surface 45.

Figure 17:
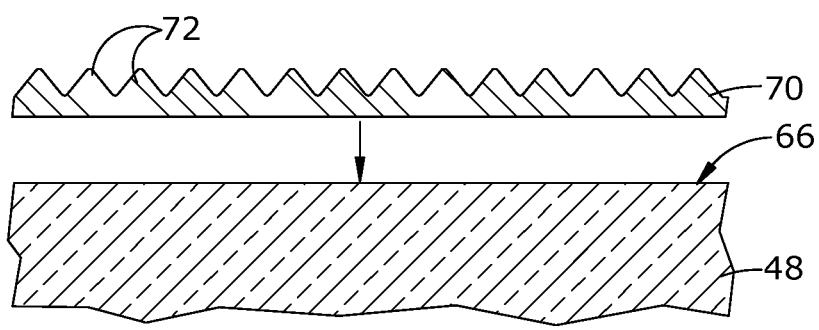
FIG. 17 is a schematic sectional view showing a process of bonding the film of FIG. 16 to an aerodynamic surface.
Figure 18:
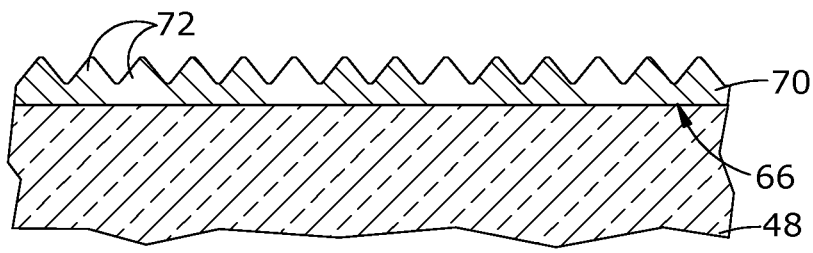
FIG. 18 is a schematic sectional view showing an aerodynamic surface with the textured film of FIG. 16 bonded thereto.

As seen in FIGS. 16 and 17, the caul sheet 74 can be used to manufacture a textured film 70 which may be applied to an aerodynamic surface. The textured film 70 is formed by first applying a curable and flowable material 68 as described above onto the caul sheet textured surface 78. Curing the film material 68 is the next step. The curing process is dependent upon the choice of film material 68. This curing process may include, but is not limited to, an application of heat and pressure, or a combination thereof. As seen in FIG. 17, once cured, the film material 68 may simply be referred to as a textured film 70 which includes riblets 72. This textured film 70 can then be removed and secured to an aerodynamic surface 66 using adhesive. FIG. 18 depicts the textured film 70 bonded to the aerodynamic surface 66 of an airfoil 48.

Figure 19:
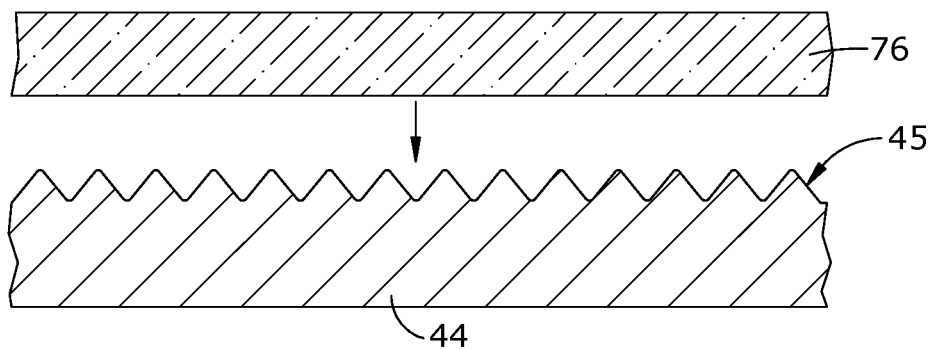
FIG. 19 is a schematic sectional view showing a process of forming a caul sheet using a master curing tool.
Figure 20:
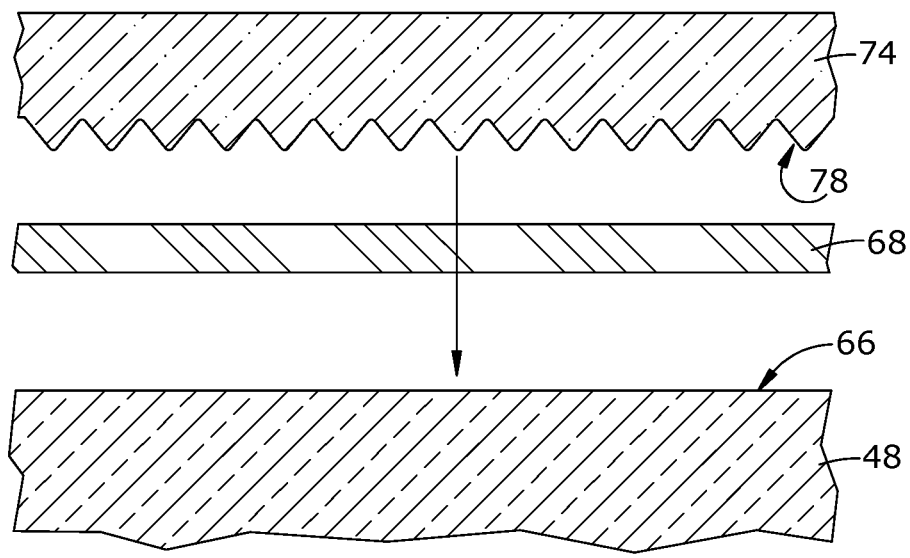
FIG. 20 is a schematic sectional view showing the process of bonding a film to an aerodynamic surface and impressing a texture therein, using the caul sheet of FIG. 19.
Figure 21:
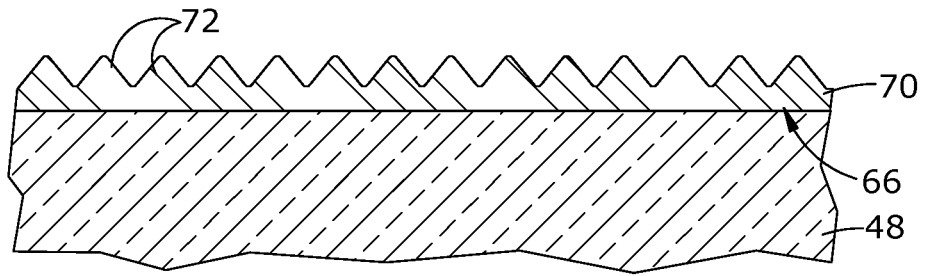
FIG. 21 is a schematic sectional view showing an aerodynamic surface with the textured film of FIG. 20 bonded thereto.

FIGS. 19-21 illustrate an exemplary process in which a caul sheet 74 is used to fabricate a textured film 70 in-situ as part of the application of the textured film 70 to an aerodynamic surface 66. The textured film 70 is formed by first applying a film material 68 substantially as described above onto the aerodynamic surface 66. Curing the film material 68 is the next step. The curing process is dependent upon the choice of film material 68. This curing process may include, but is not limited to, an application of heat and pressure, or a combination thereof. A caul sheet 74 (made from the process described above, shown in FIG. 19) may then be applied on top of the film material 68, such that the film material 68 is disposed between the caul sheet 74 and the airfoil surface 66. The caul sheet 74 is pressed into the film material 68 such that the film material 68 completely flows into the caul sheet textured surface 78, preferably free of air pockets and voids.

During the curing process, shown in FIG. 20, the caul sheet 74 is pressed into the film material 68, thus transferring the texture to the exposed surface of the film material 68. After bonding, the caul sheet 74 may be removed. It is important to note that because the caul sheet 74 goes through the film material's curing process, the selection of caul sheet material should be capable of withstanding this process. FIG. 21 shows a completed airfoil surface 66 with a cured textured film 70 bonded thereto. The textured film 70 includes a feature such as riblets 72.

Figure 22:
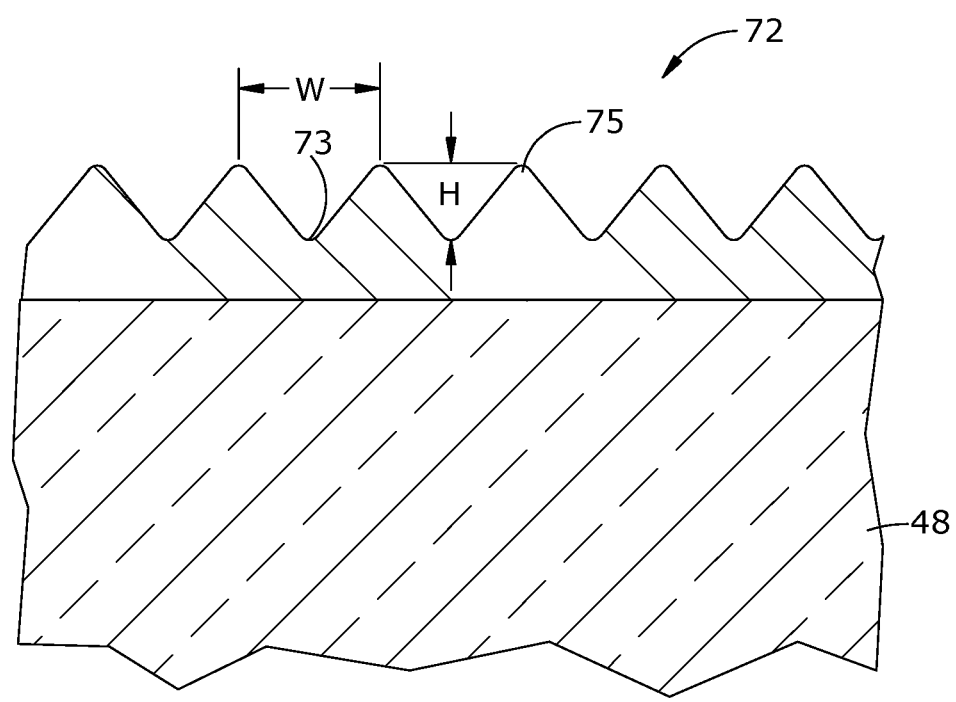
FIG. 22 is a schematic side view of an exemplary riblet structure.

The riblets 72 (formed by any of the methods described herein) may have various physical configurations to suit particular aerodynamic requirements. In one example, as depicted in FIG. 22, the array of riblets 72 define a height (H) between a riblet valley 73 and a riblet peak 75 along a direction generally perpendicular to the surface of the airfoil 48 and a maximum width (W) between riblet peaks 75 along a direction generally parallel the surface of the airfoil 48. The maximum height (H) and the maximum width (W) define an aspect ratio W:H. In one example, the aspect ratio W:H may be about 1:1 to about 2.5:1 (e.g., about 1.25:1 to about 2.25:1) with a maximum total height of about 0.65 mm or less (e.g., about 0.55 mm or less, such as about 0.4 mm or less).

The method described herein has several advantages over the prior art. In particular, it provides a reliable and economical means for applying riblets to an aerodynamic surface in a desired orientation. The presence of these features has been shown to give a significant benefit to the efficiency (SFC) of aircraft engines. By ensuring a 3D tool can be created in place of a flat tool, the riblet placement can be assured and repeated.

The foregoing has described a method for producing a textured surface. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of making a master cure tool for applying a texture to an aerodynamic surface, comprising the steps of:
   providing a foil which is metallic and has a textured surface;
   applying the foil to a forming surface of a rigid forming tool which is compound curved and plastically deforming the foil to conform to the forming surface, so as to define a foil layer;
   annealing the foil layer using heat or a combination of heat and pressure; and
   bonding the foil layer to a support body, thereby defining the master cure tool.

2. The method of claim 1 wherein the step of providing the foil comprises:
   machining a texture on a flexible substrate;
   electroforming a metallic layer onto the flexible substrate, the metallic layer defining the foil having a textured surface; and
   removing the foil from the flexible substrate.

3. The method of claim 2 wherein the flexible substrate comprises a metal alloy.

4. The method of claim 2 wherein the step of machining comprises turning.

5. The method of claim 1 wherein the foil is plastically deformed using heat and pressure.

6. The method of claim 1 wherein the plastic deformation and the annealing are performed in one step.

7. The method of claim 1 wherein the texture comprises a plurality of grooves.

8. The method of claim 1, wherein the step of applying the foil to the forming surface comprises:
   cutting the foil into one or more foil pieces, each of which is smaller than a total surface area of the forming surface; and
   applying the foil pieces to the forming surface so as to collectively define the foil layer.

9. The method of claim 1, wherein:
   the step of providing a foil includes providing two or more pieces of foil which is metallic and has a textured surface, wherein the foil pieces have different texture orientations; and
   the step of applying the foil to the forming surface includes applying the foil pieces to the forming surface so as to collectively define the foil layer.

10. The method of claim 1 wherein the forming tool comprises a metal alloy.

11. The method of claim 1 wherein the support body is separate from the forming tool.

12. The method of claim 1 further comprising transferring an impression of the textured surface to a curable film material and bonding the film material to a compound-curved aerodynamic surface.

13. A method for applying texture to an aerodynamic surface that has compound curvature, comprising the steps of:
   providing a master cure tool including a foil layer having a textured surface bonded to a support body, wherein the foil layer has compound curvature;
   transferring an impression of the textured surface to a curable film material so as to form a textured film and bonding the textured film to a compound-curved aerodynamic surface, wherein the impression of the textured surface is transferred indirectly from the textured surface to the film material, using a caul as an intermediate transfer device.

14. The method of claim 13 wherein the textured film comprises a plurality of riblets.

15. The method of claim 13 wherein the step of transferring and bonding comprises:
   applying a caul sheet material that is flowable and curable to the textured surface of the master cure tool;
   curing the caul sheet material with heat and pressure, such that it forms a caul sheet which is no longer flowable and which has a negative impression of the textured surface thereon;
   applying the film material to the caul sheet;
   curing the film material with heat and pressure, such that it forms the textured film which has a negative impression of the caul sheet thereon;
   providing a component which comprises the aerodynamic surface; and
   bonding the textured film to at least a portion of the aerodynamic surface.

16. The method of claim 13 wherein the step of transferring and bonding comprises:
   applying a caul sheet material that is flowable and curable to the textured surface of the master cure tool;
   curing the caul sheet material with heat and pressure, such that it forms a caul sheet which is no longer flowable and has a negative impression of the textured surface thereon;
   providing a component which comprises the aerodynamic surface;
   applying the film material to at least a portion of the aerodynamic surface;
   positioning the caul sheet on the film material, such that the film material is in contact with and disposed between the caul sheet and the at least a portion of the aerodynamic surface;
   curing the film material with heat and pressure, such that it forms the textured film and is adhered to the at least a portion of the aerodynamic surface; and
   removing the cured first material from contact with the textured film.

* * * * *